(12) United States Patent
Ida et al.

(10) Patent No.: US 7,773,243 B2
(45) Date of Patent: Aug. 10, 2010

(54) IMAGE FORMING APPARATUS HAVING A PRINT PROCESSING UNIT

(75) Inventors: Toshihiro Ida, Tokyo (JP); Kazuhiro Ogura, Fujisawa (JP); Shinji Makishima, Tokyo (JP); Akihiro Mizutani, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1359 days.

(21) Appl. No.: 11/229,580

(22) Filed: Sep. 20, 2005

(65) Prior Publication Data

US 2007/0070394 A1    Mar. 29, 2007

(51) Int. Cl.
*G06F 3/12* (2006.01)
*G06K 15/00* (2006.01)

(52) U.S. Cl. .................................. 358/1.14; 358/1.15

(58) Field of Classification Search .................. 358/1.1, 358/1.8, 1.9, 1.13, 1.14, 1.15, 1.18, 474, 358/468, 400, 500
See application file for complete search history.

(56) References Cited

FOREIGN PATENT DOCUMENTS

JP          10-021024 A      1/1998

*Primary Examiner*—Gabriel I Garcia
(74) *Attorney, Agent, or Firm*—Foley & Lardner LLP

(57) ABSTRACT

An image forming apparatus judges whether the number of pages to print exceeds the number as a reference to judge whether to print many pages based on the setting of a confidential document print job, when receiving the print job. When the number of pages to print exceeds the reference number, the image forming apparatus ejects printed paper sheets to a housing box having a key unit to lock not to be taken out from the main body together with printed confidential documents. When the number of pages to print does not exceed the reference number, the apparatus performs a private print which starts printing and ejecting printed paper sheets to the paper eject unit after receiving an instruction from a user.

20 Claims, 9 Drawing Sheets

| Job ID | Date/time of Reception | Use ID | Pages to print | Data body |
|---|---|---|---|---|
| J00021 | 2005/02/26 08:00 | Taro | 3 | XXX.ps |
| J00022 | 2005/02/26 11:00 | Hanako | 35 | xyx.ps |
| J00023 | 2005/02/26 16:50 | Jiro | 5 | zxy.ps |

| Housing box | Exclusive user (User ID or Group ID) | Time |
|---|---|---|
| BOX 1 | Hanako | 2005/02/25 15:33 |
| BOX 2 | Group B | 2005/02/25 16:50 |
| ⋮ | ⋮ | ⋮ |

| User ID | Group ID | Mail address |
|---|---|---|
| Taro | Group A | Taro@***** |
| Hanako | Group B | Hanako@***** |
| Jiro | Group A | Jiro@***** |
| ⋮ | ⋮ | ⋮ |

| Reference number memory |
|---|
| 30 |

|   | User ID (or group ID) |
|---|---|
| 1 | Taro |
| 2 | Hanako |

P — Number of papers to change    [ 30 sheets ]

11d — [ OK ]    [ CANCEL ]

IMAGE FORMING APPARATUS HAVING A PRINT PROCESSING UNIT

BACKGROUND OF THE INVENTION

1. Field of the Invention

The present invention relates to an image forming apparatus which efficiently outputs a confidential document.

2. Description of the Related Art

A printer server system is known, which stores a confidential document print job in a printer server, receives a confidential document from a server by entering a user's password into a printer, and performs printing. (Jpn. Pat. Appln. KOKAI Publication No. H10-21024) In this system, a printed document is ejected to an ejected paper tray for a printed confidential document, but the ejected paper tray is locked. When a correct password is entered, the tray is unlocked and the printed confidential document can be taken out from the ejected paper tray.

In this prior art, when printing a confidential document, the user enters a password on the touch panel of the printer, and the printer can receive the print data from a server, and print the data. Thus, when there are many confidential documents, the user must wait a front of the printer until the printer finishes printing.

Confidential documents are taken out in the above way. Thus, while one user is taking out a certain confidential document, the other users cannot start taking out the other confidential documents until the first user finishes taking out their confidential document.

Therefore, there is a need for an image forming apparatus which can reduce the users' waiting time for taking out confidential documents.

BRIEF SUMMARY OF THE INVENTION

According to an aspect of the present invention, there is provided an image forming apparatus comprising an interface configured to connect a network; a housing box configured to have a key unit to lock not to be taken out from the main body together with a printed confidential document; a paper eject unit configured to eject printed paper sheets; a reference number memory configured to store a reference number to judge whether to print many pages; a reference number memory configured to store a reference number to judge whether to print many pages; a judgment unit configured to judge whether the number of pages to print exceeds the reference number stored in the reference number memory based on the setting of a confidential document print job, when receiving the print job through the interface; a first print processing unit configured to eject printed paper sheets to the housing box when the judgment unit judges that the number of pages to print of the received print job exceeds the reference number stored in the reference number memory; and a second print processing unit configured to perform a private print which starts printing and ejecting printed paper sheets to the paper eject unit after receiving an instruction from a user, when the judgment unit judges that the number of pages to print of the received print job does not exceed the reference number stored in the reference number memory.

Objects and advantages of the invention will become apparent from the description which follows, or may be learned by practice of the invention.

BRIEF DESCRIPTION OF THE SEVERAL VIEWS OF THE DRAWING

The accompanying drawings illustrate embodiments of the invention, and together with the general description given above and the detailed description given below, serve to explain the principles of the invention.

FIG. 5 is a print job database in the same embodiment;

FIG. 6 is an exclusive user table in the same embodiment;

FIG. 7 is a user information database in the same embodiment;

FIG. 8 is a view showing a memory to store a reference number in the same embodiment;

FIG. 9 is an authority table in the same embodiment;

FIG. 10 is a view showing an example of a setting screen to change the reference number in the same embodiment;

DETAILED DESCRIPTION OF THE INVENTION

An embodiment of the present invention will be explained with reference to the accompanying drawings.

Figure 1:
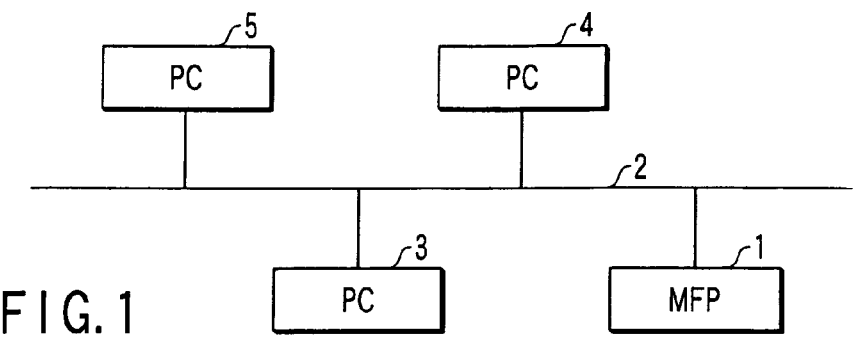
FIG. 1 is a schematic diagram of a network configuration in an embodiment of the present invention.

FIG. 1 is a schematic diagram of a network configuration in an embodiment of the present invention. As shown in FIG. 1, a multifunction peripheral (hereinafter called MFP) 1 is connected to PC 3, PC 4 and PC 5 through a network 2. Three PCs are connected to the network 2, but the number of the PCs is not limited to three.

Figure 2:
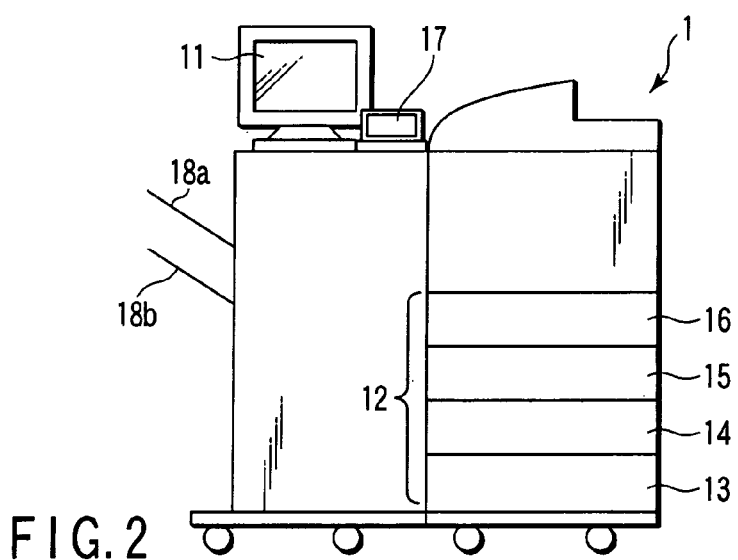
FIG. 2 is a schematic front view of an MFP in the same embodiment.

FIG. 2 is a schematic front view of the MFP 1. The MFP 1 is provided with a control panel 11 or a touch panel display, a paper supply tray fitting part 12 which contains paper supply trays 13 and 14 for housing paper sheets and housing boxes 15 and 16 for housing confidential documents, a card reader 17 to read information from an IC card, and ejected paper trays 18a and 18b to stack ejected printed paper sheets. The housing boxes 15 and 16 can contain the paper sheets ejected by using an auto-duplex unit (ADU), and can be fit in the paper supply tray fitting part 12. Namely, When the housing boxes 15 and 16 are not used in the MFP 1, a new paper supply tray can be set instead of the housing boxes 15 and 16.

Figure 3:
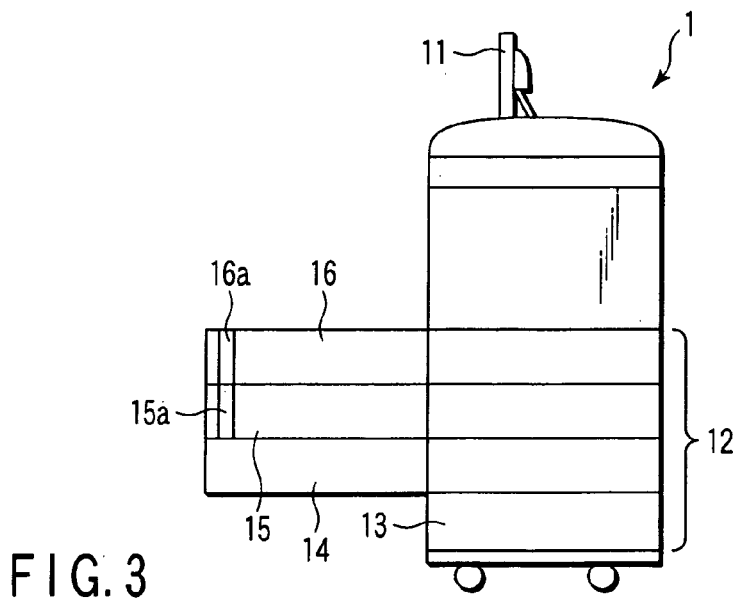
FIG. 3 is a schematic side view of the MFP in the same embodiment, with a housing box pulled out.

FIG. 3 is a schematic side view of the MFP 1 with a housing box pulled out. Key units 15a and 16a are provided in the housing boxes 15 and 16, respectively. The key units 15a and 16a are locked while the housing boxes 15 and 16 are contained in the MFP 1. The key units 15a and 16a are unlocked when it is confirmed by the process described later that the user exclusively uses the housing box. When the key units 15a and 16a are unlocked, the housing boxes 15 and 16 can be pulled out from the MFP 1 as shown in FIG. 3.

In FIG. 3, the two housing boxes 15 and 16 are pulled out, but it is of course possible to pull out each housing box. Two housing boxes 15 and 16 and two paper supply trays 13 and 14 are used, but the number of housing box and paper supply tray is not limited to this. One or three housing boxes are permitted. However, it is necessary to provide at least one paper supply tray in the MFP 1. Thus, if there are four paper supply tray fitting part 12, the number of housing boxes is three maximum.

Figure 4:
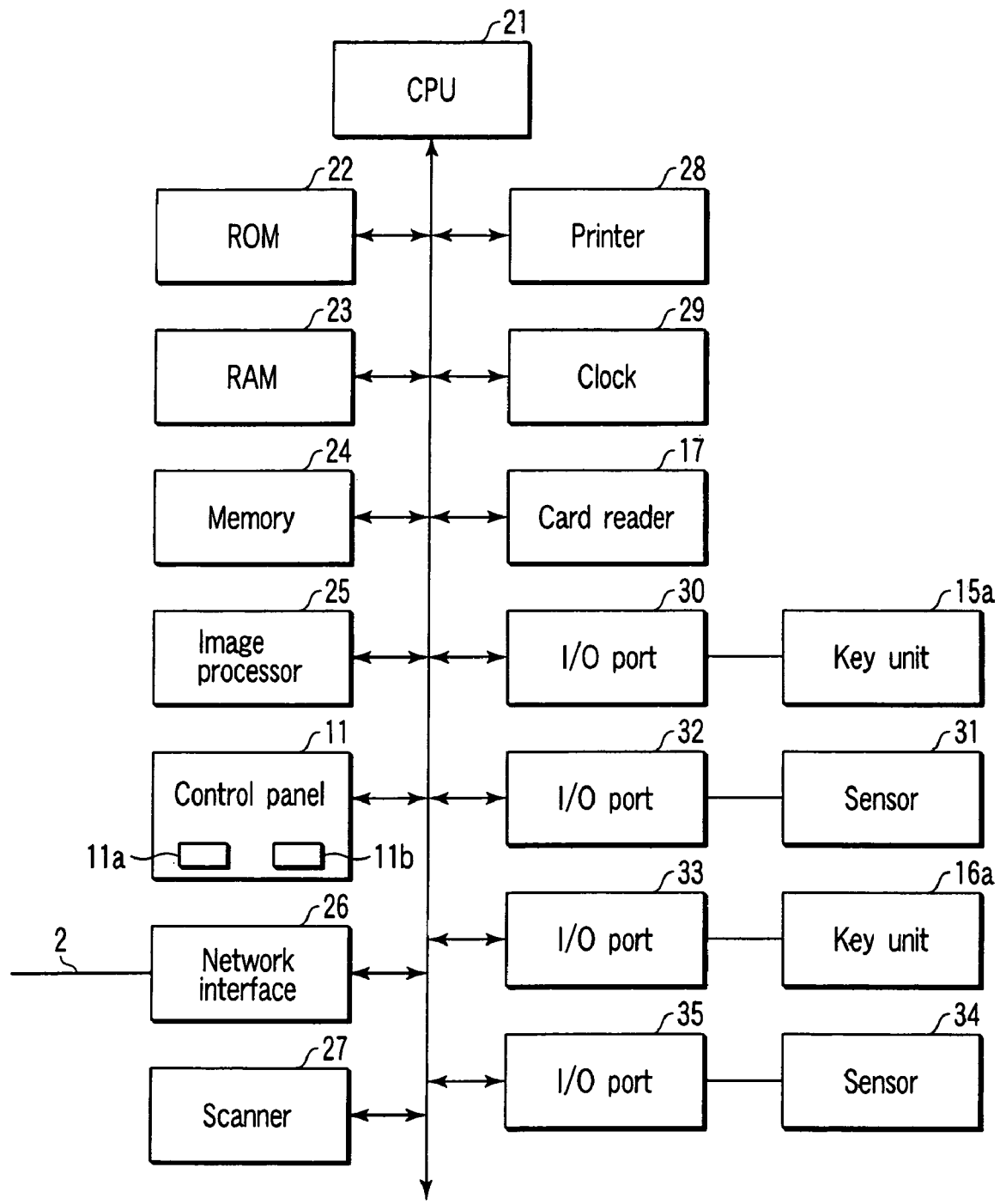
FIG. 4 is a block diagram of the configuration of the essential units of the MFP in the same embodiment.

FIG. 4 is a block diagram of the essential components of the MFP. As shown in FIG. 4, the MFP 1 comprises a CPU 21, a ROM 22, a RAM 23, a memory 24, an image processor 25, a control panel 11, a network interface 26, a scanner 27, a printer 28, a clock 29, a card reader 17, an I/O port 30, a key unit 15a, a sensor 31, an I/O port 32, a key unit 16a, an I/O port 33, a sensor 34, and an I/O port 35. The CPU 21, ROM 22, RAM 23, memory 24, image processor 25, control panel 11, network interface 26, scanner 27, printer 28, clock 29, card reader 17, and I/O ports 30, 32, 33 and 35 are connected through a bus line.

The CPU 21 controls the whole MFP 1 by executing the control program stored in the ROM 22. The ROM 22 stores the control program and fixed data to be executed by the CPU 21. The RAM 23 has a work area required by the CPU 21 to execute the control program stored in the ROM 22.

The memory 24 is a hard disk drive, for example. The memory 24 stores various data such as image data, print job database described later, exclusive user table, user information database, reference number, authority table and fixed time. The memory 24 stores also various programs. The image processor 25 compresses or decompresses the image data. The control panel 11 has a control unit 11a and a display unit 11b. The control unit 11a informs the CPU 21 of the instruction received from the user. The display unit 11b displays the information necessary for the user under the control of CPU 21. The network interface 26 is used for connection with the network 2. The scanner 27 reads an image from a document set on a not-shown document table or from a document sent from a not-shown automatic paper supply unit, and creates image data. The created image data is compressed by the image processor 25, and stored in the memory 24. The printer 28 forms an image on a paper sheet based on the print job received through the network 2 or the image data read from the memory 24 and decompressed by the image processor 25. The clock 29 creates date and time information. The date and time information created by the clock 29 is supplied to the CPU 21 as needed.

The card reader 17 reads the information stored in an IC card. An IC card stores the information indicating the user ID. The key units 15a and 16a are keys to lock the housing boxes 15 and 16. The I/O port 30 informs the key unit 15a of the instruction to lock or unlock from the CPU 21. The I/O port 32 transmits a signal from the sensor 31 to the CPU 21. The sensor 31 detects whether the printed paper sheet is housed in the housing box 15. The key unit 16a is a key to lock the housing box 16. The I/O port 33 informs the key unit 16a of the instruction to lock or unlock from the CPU 21. The I/O port 35 transmits a signal from the sensor 34 to the CPU 21. The sensor 34 detects whether the printed paper sheet is housed in the housing box 16.

Next, explanation will be given of a print job database D1, an exclusive user table T1, a user information database D2, a reference number memory 24a, authority table T2, and a fixed time period memory 24b stored in the memory 24 with reference to FIG. 5 to FIG. 11.

FIG. 5 shows the print job database D1. The print job database D1 lists the information about a print job as data when receiving a print job. A print job to receive may be either an ordinary print job or a print job for confidential contents. Whether the contents are confidential is determined by the whether the user specifies one of the housing boxes 15 and 16 as a rejection destination, for example. As shown in FIG. 5, the print job database D1 manages the following items concerning each print job. Namely, the print job database D1 manages a job ID, a reception date and time, a user ID, pages to print, and data body. The job ID stores an additional ID for discrimination in the MFP 1. The reception date and time contains the date and time of reception of print job from one of the PCS 3, 4 and 5 through the network 2. The user ID contains the user ID of the user who lists a print job in the print job database D1. The pages to print contains the number of pages to print based on a print job. The data body contains the data indicating the contents to be printed.

FIG. 6 shows the table T1 of exclusive users who exclusively use the housing box 15 or housing box 16. The exclusive user table T1 manages the following items concerning the housing boxes 15 and 16. Namely, the exclusive user table T1 manages a housing box, an exclusive user, and time. The housing box contains a box 1 that is the name of the housing box 15 to contain confidential documents, and a box 2 that is the name of the housing box 16. The exclusive user column contains the user IDs of the users who exclusively use the housing box. The user ID is "Hanako", for example. The exclusive user column may contain a group ID instead of a user ID. In this case, a "Group B" is contained, for example. The time column contains the date and time of exclusive use of the housing box obtained from the clock 29.

FIG. 7 shows the user information database D2. The user information database D2 manages the following items concerning each user. Namely, the user information database D2 manage a user ID, a group ID, and a mail address. The user ID contains the user ID of the user who sends a print job. The group ID contains the group ID of the group to which the user belongs. The mail address contains the mail address of the user.

FIG. 8 shows the reference number memory 24a to store a reference number. The reference number is the number to determine whether a confidential document print job is ejected to the housing box 15 or 16, or whether the paper sheets printed as a private print are ejected to the ejected paper tray 18a or 18b.

FIG. 9 shows the authority table T2 to list the users having the right to change the reference number stored in the reference number memory 24a. As shown in FIG. 9, the authority table T2 lists the user IDs of the users having the right to change the reference number. Therefore, only the users listed in the authority table T2 can change the reference number stored in the reference number memory 24a. The reference number is changed as follows, for example. The user first holds the IC card over the card reader 17, and makes the MFP 1 verify the user listed in the authority table T2. Then, the user operates the control unit 11a of MFP 1 to call up a setting screen to change the reference number on the display 11b.

FIG. 10 shows an example of the setting screen 11c. The user sets a reference number by moving the pointer P with right and left arrow keys (not-shown), for example. The OK button 11d is pressed to store the reference number in the reference number memory 24a. The user can change a reference number to a desired number, in this way. It is also possible to change the reference number setting from one of the PCs 3, 4 and 5 connected to the network 2, without using the control panel 11 of MFP 1. In this case, also, the user first makes the MFP 1 verify the user listed in the authority table T1, and operate the control unit of the PC to call up the setting screen 11c on the display, and set a reference number by moving the pointer P and pressing the OK button 11d.

Figure 11:
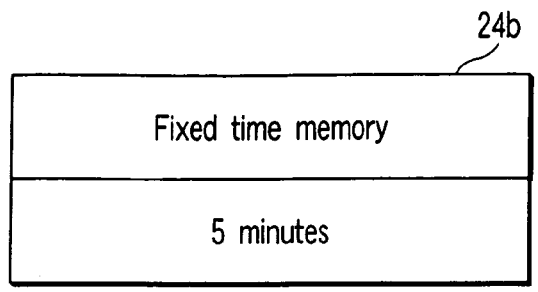
FIG. 11 is a view showing a memory to store a fixed time period used for sending a warning mail in the same embodiment.

FIG. 11 shows a fixed time period memory 24b to store a fixed time period used for sending a warning mail described later indicating that the printing contents of a print job are confidential documents, to the sender of the print job. The user can change the fixed time period stored in the fixed time period memory 24b by the control panel 11 of MFP 1 or from one of the PCs 3, 4 and 5 connected to the network 2.

Figure 12:
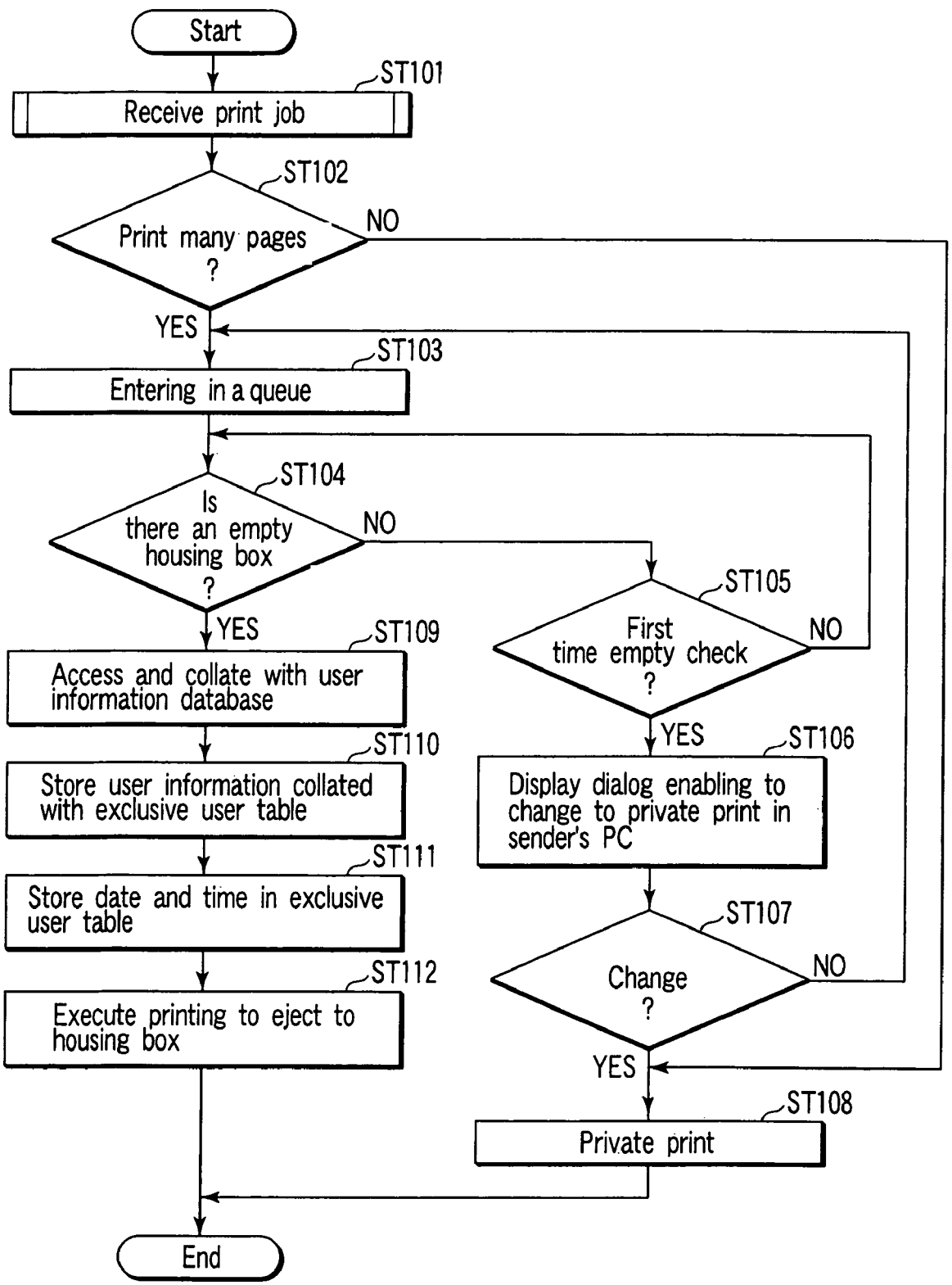
FIG. 12 is a flowchart showing a processing taken when a confidential document print job is received in the same embodiment.

Now, explanation will be given on the process when the MFP 1 receives a confidential document print job from the PC 3 through the network 2. FIG. 12 is a flowchart showing a process to be executed by the CPU 21 when receiving a confidential document print job.

The CPU 21 performs a receiving process (ST 101) when receiving a confidential document print job. Concretely, a received print job is listed in the print job database D1. The CPU 21 judges whether the received print job is a job to print many pages (ST 102). Concretely, the printing pages of the print job listed in the print job database D1 are compared with the reference number stored in the reference number memory 24a. The print job is judged as a print job to print many pages when the printing pages are the reference number or more than the reference number, and as a print job not to print many pages when the printing pages are less than the reference number.

When the print job is judged as a print job to print many pages (YES in ST 102), the CPU 21 enters the confidential document print job in a queue (ST 103). The CPU 21 checks whether there is an empty housing box (ST 104). The CPU 21 determines whether one of the housing boxes 15 and 16 is empty, based on the signal output from the sensors 31 and 34.

When there is no empty box (NO in ST 104), the CPU 21 checks whether the decision of ST 104 is the first time (ST 105), namely, whether the decision of no empty box is the first time or not. When the decision is the first time (YES in ST 105), the CPU 21 makes the PC 3 sending the confidential document print job display a dialog to indicate that the print job can be changed to a private print (ST 106). This dialog inquires the print job sender of whether to change the confidential document print job to a private print, or to hold it in the queue. The CPU 21 determines whether to accept the instruction to change to a private print, from this dialog (ST 107).

When the CPU 21 determines that the instruction to change to a private print is accepted (YES in ST 107), or determines that the print job is not to print many pages (NO in ST 102), the CPU 21 lists the confidential document print job as a private print job (ST 108). Thus, even if the number of prints to be printed by the print job is more than the reference number and there is no empty housing box, or when the number of pages to be printed by the print job is less than the reference number, the print job is changed to a private print job.

When the CPU 21 accepts the instruction to hold the print job in a queue (NO in ST 107), the CPU 21 goes back to the processing of step ST 103 and holds the confidential document print job in a queue. On the other hand, when the CPU 21 judges that the decision is not the first time (NO in ST 105), the CPU 21 returns to the step ST 104 and determines whether there is an empty housing box. Namely, the confidential document print job is held in a queue until the CPU 21 determines that there is an empty housing box.

When the CPU 21 determines that there is an empty housing box (YES in ST 104), the CPU 21 accesses the user information database D2 and verifies that the user of the PC 3 who sends the print job listed in the queue is the user listed in the user information database D2 (ST 109). The CPU 21 assigns the verified user information to the exclusive user area corresponding to the box name of the housing box judged empty in the exclusive user table T1. The user information is a user ID (or group ID). Further, the CPU 21 stores the information indicating the date and time obtained from the clock 29 at that time in the time area corresponding to the box name in the exclusive user table T1 (ST 111). The CPU 21 executes the print job, and ejects the printed paper sheets to the housing box (ST 112).

Figure 13:
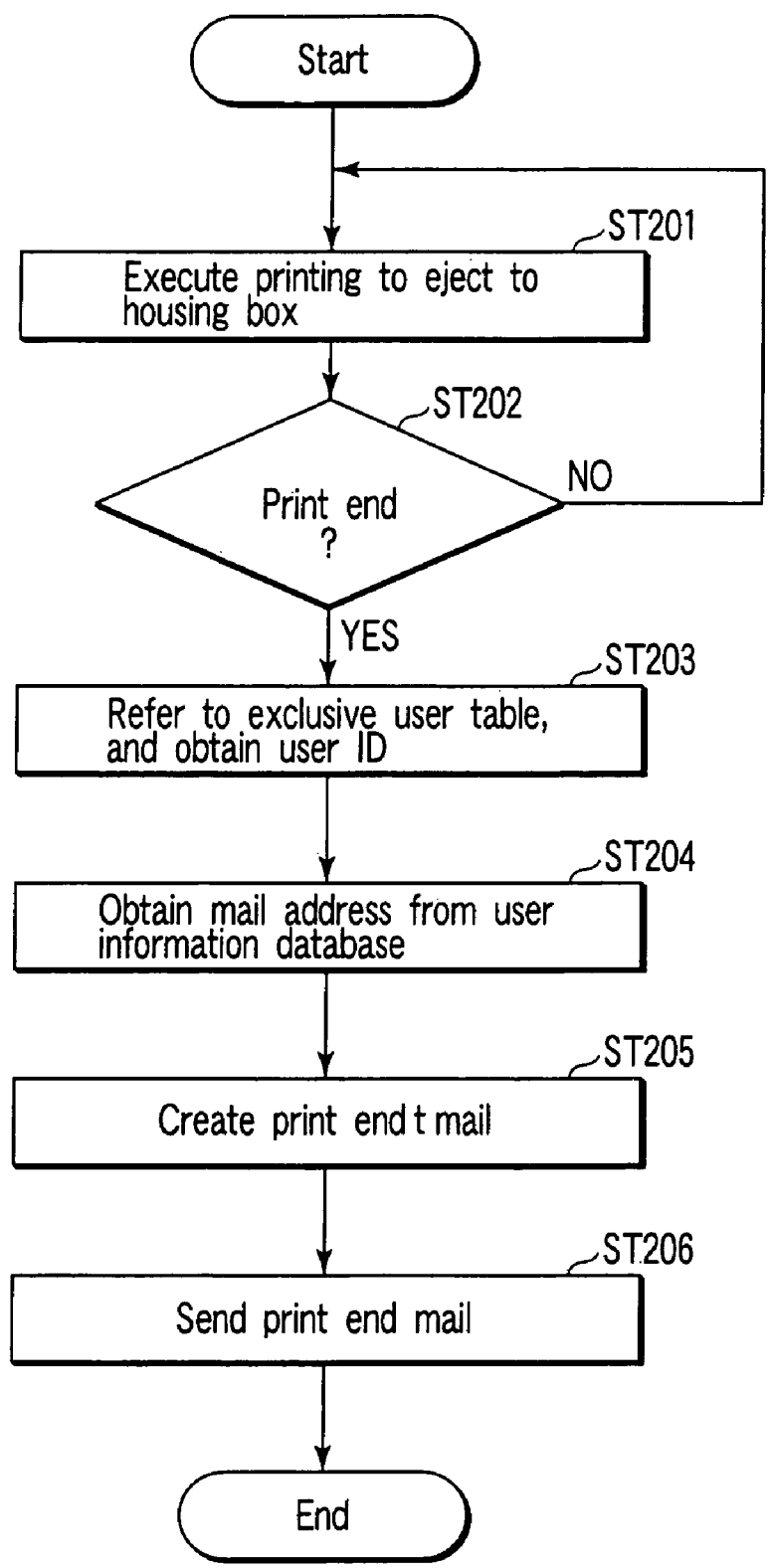
FIG. 13 is a flowchart showing a process of sending a print end mail in the same embodiment.

Explanation will now be given of a process of sending the print job sender a print end mail indicating that the printed paper sheets have been ejected to the housing box. FIG. 13 is a flowchart showing a print end mail sending process executed by the CPU 21.

The CPU 21 performs printing based on the confidential document print job held in a queue, and sequentially contains the printed paper sheets in the housing box (ST 201). The CPU 21 determines whether the printing is finished (ST 202). The CPU 21 performs processing to the printed paper sheets containing in the housing box until the printing is finished. When the CPU 21 determines that the printing is finished (YES in ST 202), the CPU 21 refers to the exclusive user table T1 (ST 203).

The CPU 21 accesses the user information database D2 based on the user ID listed in the exclusive user column in the exclusive user table T1, and obtains the mail address stored corresponding to that user ID (ST 204). Namely, the CPU 21 obtains the mail address of the PC 3 user. The CPU 21 creates a print end mail including a print end message (ST 205). In addition to the print end message, the name of a housing box containing the printed paper sheets may be added to the print end mail. The CPU 21 sends the print end mail to the obtained mail address through the network 2 (ST 206).

Figure 14:
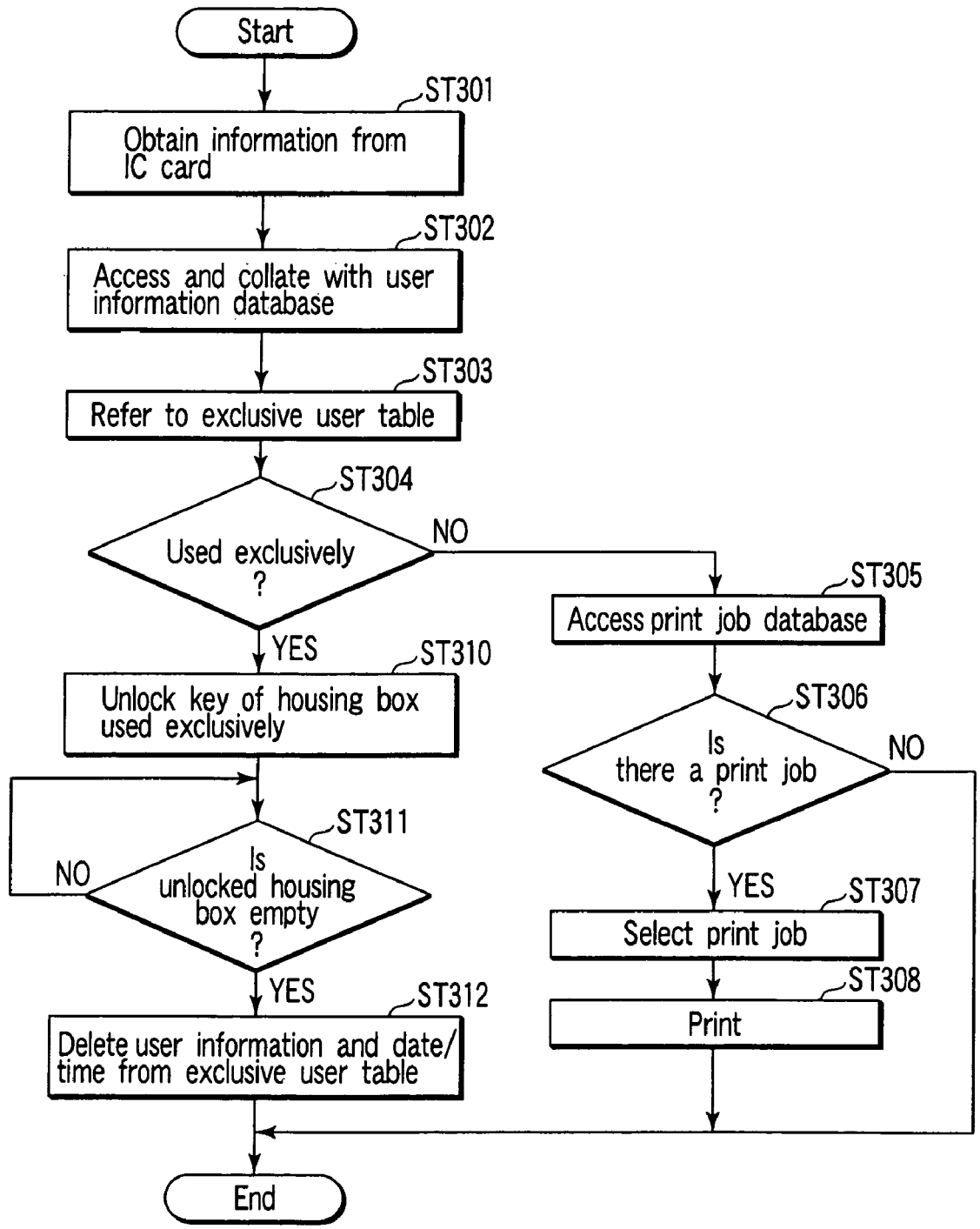
FIG. 14 is a flowchart showing a process of taking out printed paper sheets from a housing box in the same embodiment.

Next, explanation will be given of a process of taking out the printed paper sheets from the housing box, after the PC 3 user who has sent the print job to the MFP 1 receives the print end mail. FIG. 14 is a flowchart showing a process executed by the CPU 21 when the user takes out the printed paper sheets from a housing box.

First, the CPU 21 obtains the information read from an IC card by the card reader 17 (ST 301). The user ID (or group ID) indicating the user having the IC card is obtained from the IC card. The CPU 21 accesses the user information database D2, and verifies that the obtained user ID is of the user listed in the user information database D2 (ST 303). The CPU 21 refers to the exclusive user table T1 (ST 303).

The CPU 21 determines whether the user ID obtained from the IC card is identical to one of the user IDs contained in the exclusive user column in the exclusive user table T1 (ST 304). When there is no identical user ID (NO in ST 304), the CPU 21 accesses the print job database D1 (ST 305), and determines whether the user ID obtained from the IC card is listed in the print job database D1 (ST 306). When the print job is not listed (NO in ST 306), the process is terminated. If the print job is listed (YES in ST 306), the CPU 21 selects that print job (ST 307). The CPU 21 controls the printer 28, and executes printing based on the selected print job (ST 308). The private print job is executed in this way.

If an identical user ID is found (YES in ST 304), the CPU 21 sends an instruction to unlock the housing box used exclusively by that user to the key unit provided in the housing box through the I/O port (ST 309). For example, when the housing box 15 is exclusively used, the instruction to unlock the key unit 15a is sent through the I/O port 30. The key unit 15a receives the instruction, and unlocks the housing box. Thus, the housing box 15 can be pulled out from the MFP 1.

The CPU 21 determines whether the unlocked housing box becomes empty (ST 310). This is determined based on the signal sent from the sensor 31 provided in the housing box 15 through the I/O port 32, for example. When the housing box is empty (YES in ST 310), the CPU 21 deletes the corresponding user ID and time stored that housing box managed in the exclusive user table T1 (ST 311). The housing box is replaced to the MFP 1 by the user, and locked again.

Figure 15:
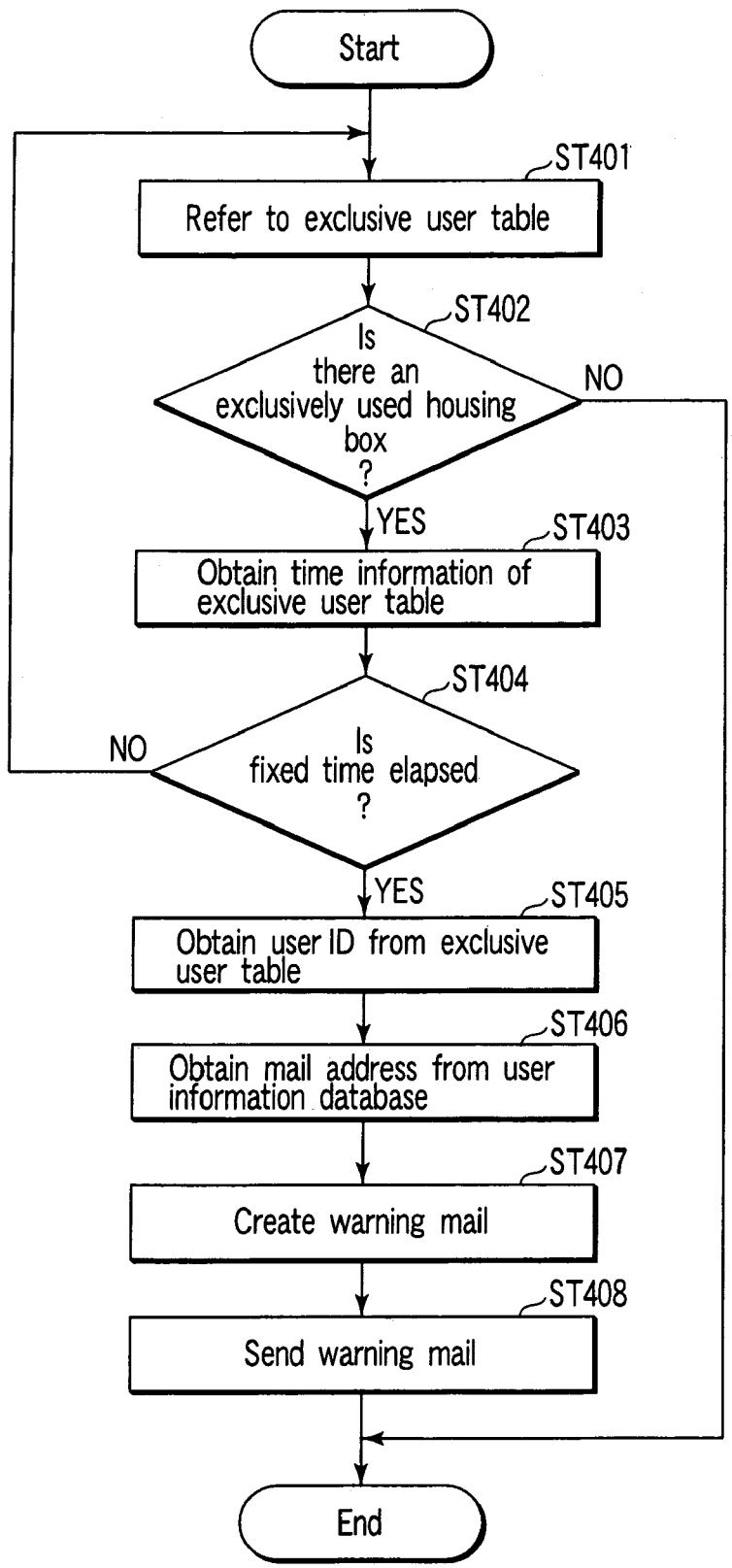
FIG. 15 is a flowchart showing a processing taken when printed paper sheets are not taken from a housing box in the same embodiment.

Next, explanation will be given of the process to be executed when the user who has sent a confidential document print job to the MFP 1 does not take out printed paper sheets from the housing box after receiving a print end mail. FIG. 15 is a flowchart showing the process to be executed by the CPU 21 when printed paper sheets are not taken out from a housing box.

The CPU 21 refers to the exclusive user table T1 at a fixed timing (ST 401). The fixed timing a fixed time period, for example, at every one minute. The CPU 21 determines whether there is a housing box used exclusively (ST 402). This is performed based on whether data is contained in the exclusive user and time columns in the exclusive user table T1. When there is no housing box used exclusively (No in ST 402), the CPU 21 terminates the process.

When there is a housing box used exclusively (YES in ST 402), the CPU 21 accesses the exclusive user table T1 and obtains the time information corresponding to the exclusively used housing box, that is, the information contained in the time column of the table (ST 403). Then, the CPU 21 determines whether the time to exclusively use the housing box passes over a fixed time period (ST 404). Concretely, the time to exclusively use the housing box is calculated from the time obtained from the clock 29 and the time obtained from the exclusive user table T1. The CPU 21 determines whether that time exceeds the fixed time period stored in the fixed time period memory 24b explained with reference to FIG. 11. This determines whether the time to exclusively use the housing box passes over the fixed time period. When the fixed time period is not exceeded (No in ST 404), the CPU 21 goes back to the processing of step ST 401 and repeats the processing of steps ST 401 to ST 404.

When the fixed time period is exceeded (YES in ST 404), the CPU 21 refers to the exclusive user table T1 and obtains the user ID of the user judged to have exclusively used the housing box from the exclusive user column (ST 405). The CPU 21 accesses the user information database D2, and obtains the mail address corresponding to the obtained user ID (ST 406). The CPU 21 creates a warning mail stating "Please come and take the confidential document" (ST 407). The CPU 21 sends the warning mail to the obtained mail address through the network 2 (ST 408).

Explanation will now be given of the functions of the MFP 1 configured as described above.

For example, the user sends a confidential document print job to print the number of pages not more than the reference number, from the PC 3 to MFP 1. Receiving this confidential document print job, the MFP 1 changes and lists the print job as a private print, because the number of pages to print does not exceed the reference number.

The user sends a confidential document print job to print the number of pages more than the reference number, from the PC 3 to MFP 1. Receiving this confidential document print job, the MFP 1 checks if the housing box is exclusive used, because the number of pages to print does exceed the reference number. When there is a housing box not exclusively used, the MFP 1 executes the print job, and ejects the printed paper sheets to that housing box.

After ejecting the printed paper sheets to the housing box, namely after the printing is completed, the MFP 1 sends a print end mail stating the end of printing to the PC 3 of that user. The user can confirm the end of printing by the print end mail displayed on the PC 3. The user carries the IC card and goes to the MFP 1 to take out the printed document.

The user holds the IC card over the card reader 17 of MFP 1. The MFP 1 obtains the user ID from the IC card. The MFP 1 collates the obtained user ID with the user IDs listed in the exclusive user table T1. When the user ID coincides with the user ID of the user using exclusively the housing box, the key unit of that housing box is unlocked. The user pulls out that housing box from the MFP 1, and takes out the prints contained in the box. The user pushes the housing box into the MFP 1. The key unit of that housing box is locked. Thereafter, the housing box cannot be pulled out from the MFP 1.

Figure 16:
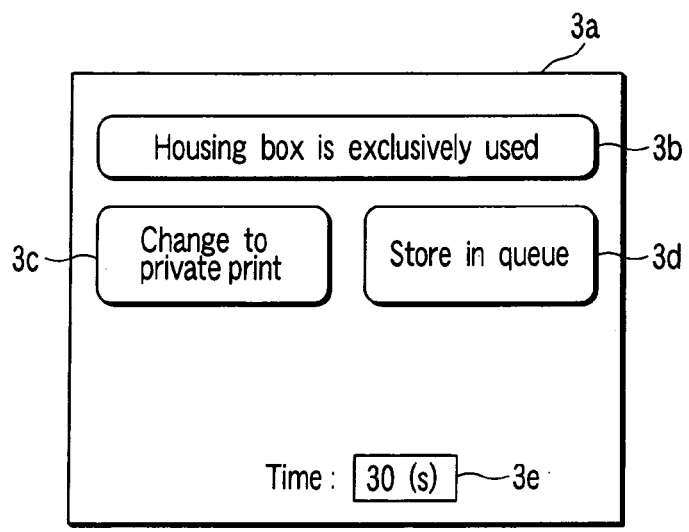
FIG. 16 is a display example of dialog in the same embodiment.

When a housing box is used exclusively is not found, or when an empty housing is not found, a dialog stating the possibility to change to a private print is displayed on the PC 3 of the user. FIG. 16 shows a display example of the dialog 3a. As shown in FIG. 16, the dialog 3a displays a message 3b "Housing box is used exclusively", a button 3c to change to a private print, and a button 3d to store in a queue. The "30 (s)" 3e shown in FIG. 16 indicates the time to erase automatically the dialog 3a. Therefore, the time counting is started after the dialog 3a is displayed, and if any button is not pressed when the display changes to 0 (after 30 seconds), the display of dialog 3a is closed. The print job is held in the queue, and not changed to a private print.

When changing a print job sent by the user to a private print, the button 3c is pressed. The print job is changed to a private print. The user goes to the MFP 1 at a desired timing, and holds the IC card over the card reader 17 of MFP 1. The MFP 1 obtains the user ID of the user from the IC card. The MFP 1 collates the obtained user ID with the user ID listed in the print job database D1. The private print job identical to the listed user ID is executed, that is, the private print is executed.

When the user holds the print job in a queue, the button 3d is pressed. The print job is held in the queue. When the housing box is not emptied even after a certain time passes, the MFP 1 sends a warning mail to the exclusive user of the housing box. When the prints are taken out from the housing box used exclusively, the printed paper sheets are ejected to the housing box, and the print job to print confidential document held in the queue is executed. After the printing is completed, a print end mail is sent to the PC 3 of the user. After confirming the print end mail, the user goes to take out the printed document. The printed document taking-out operation is the same as the case that an empty housing box exists when a private print job is sent.

The MFP 1 in this embodiment has the following effects.

When receiving a confidential document print job, the MFP 1 performs a private print if the number of pages to print of that print job is less than the reference number stored in the reference number memory 24a. Namely, the MFP 1 uses the housing box only when the number of pages of a confidential document is more than the reference number. Therefore, when the number of pages of a confidential document is less than the reference number, the user performs a private print after operating the MFP 1. Therefore, when the number of pages of a confidential document is less than the reference number, the user can print the confidential document before the housing box is emptied without being seen by a third party, and can decrease the competition for the housing box. A confidential document having the number of pages exceeding the reference number is immediately printed if there is an empty housing box. Therefore, the housing box of the MFP 1 can be efficiently used by the user without waiting for a long time for taking out a printed document.

A user having the right to change the reference number can specify the reference number that is taken as a reference to determine whether the number of prints is many or less at any time from the control unit 11a of MFP 1 or from any one of the PC 3, PC 4 and PC 5 connected through the network 2. By limiting the user who can change the specification of reference number, an unnecessary change of the reference number can be prevented. In this embodiment, only the user having the user ID listed in the authority table T2, that is, only the user having the right to change the reference number can change the setting of reference number. However, all users may change the setting of reference number without setting the above limitation.

For the housing boxes 15 and 16, it is possible to provide boxes to eject paper sheets with the same mechanism as ADU in the paper supply tray fitting part 12 in the MFP 1. Thus, it is unnecessary to take new space for mounting the housing boxes 15 and 16 in the MFP 1. Further, as the conventional paper supply tray fitting part 12 is used, an ordinary paper supply tray can be provided when the housing boxes 15 and 16 are not provided in the MFP 1.

The housing boxes 15 and 16 have key units 15a and 16a, respectively. The key units 15a and 16 prevent the confidential documents in the housing boxes 15 and 16 from being seen by a third party. Further, while containing only a confidential document of a certain user, the housing boxes 15 and 16 do not contain confidential documents of the other users. Namely, the housing boxes 15 and 16 are exclusively used by a certain user. Therefore, it is prevented that a confidential document of one user is mix with confidential documents of other users in the housing boxes 15 and 16.

The housing boxes 15 and 16 can also set to be shared by the unit of groups. The MFP 1 can permit only the users of the same group to see confidential documents. The users of the same group need not to manage the file data of confidential documents. The confidential documents can be efficiently managed.

If a user does not take out a confidential document from the housing boxes 15 and 16 for a certain period after storing the confidential document in the boxes, the MFP 1 sends a warning mail to the user to urge to come and take out the confidential documents. The MFP 1 sends a print end mail after confidential documents are ejected to the housing boxes 16 and 15, in order to decrease the situation that the users wait.

Figure 17:
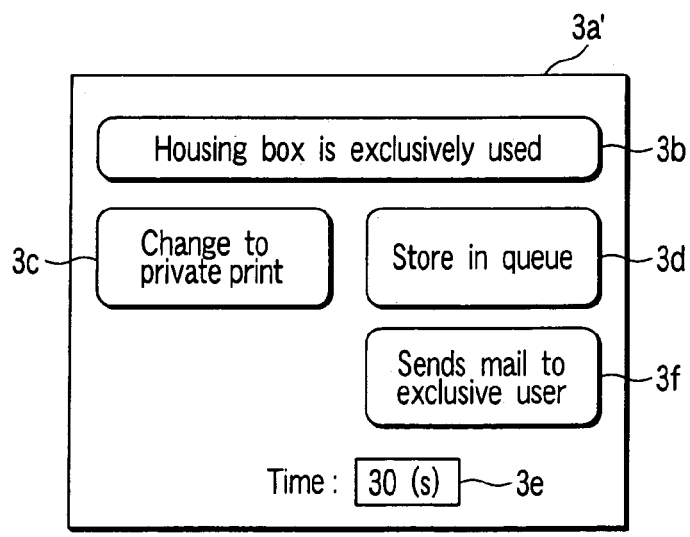
FIG. 17 is an example of display when a button to send a warning mail is provided in a dialog in the same embodiment.

In the description of the above embodiments, a warning mail is sent a certain time after the end of printing. However, it is permitted instead of or together with that to provide a button 3f for sending a warning mail to a dialog 3a to indicate that the user can change a private print, and to send a warning mail when the button 3f is pressed. FIG. 17 shows a display example 3a' when the button 3f is provided for sending a warning mail to the dialog 3a. As shown in FIG. 17, the button 3f for sending a warning mail is provided in the dialog 3a'. When the user presses this button 3f, the processing from step ST 405 to ST 408 explained with reference to FIG. 15 will be executed by the MFP 1 and a warning mail will be sent to an exclusive user.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the invention as defined by the appended claims and equivalents thereof.

What is claimed is:

1. An image forming apparatus comprising:
    a housing unit configured to have a key unit to lock not to be taken out from the main body together with printed confidential documents;
    a paper eject unit configured to eject printed paper sheets;
    a reference number memory unit configured to store a reference number to judge whether number of pages to be printed out exceeds predetermined print out pages;
    a detecting unit configured to detect whether the number of pages to print exceeds the reference number stored in the reference number memory based on the setting of a confidential document print job, if receiving the print job through an interface configured to connect a network; and
    a first print processing unit configured to eject printed paper sheets to the housing unit if the detecting unit detects that the number of pages to print of the received print job exceeds the reference number stored in the reference number memory.

2. The image forming apparatus according to claim 1, further comprising a reference number changing unit configured to change the reference number stored in the reference number memory unit.

3. The image forming apparatus according to claim 2, further comprising a control unit, wherein the reference number changing unit is the control unit.

4. The image forming apparatus according to claim 2, wherein the reference number changing unit is a control unit of a computer connected to the network.

5. The image forming apparatus according to claim 2, further comprising:
    a user registration unit configured to register a user having the right to change the reference number stored in the reference number memory unit by the reference number changing unit; and
    a registered user verifying unit configured to verify whether a user has been registered in the user registration unit,
    wherein if a user is verified to be a user registered in the user registration unit, the user can change the reference number.

6. The image forming apparatus according to claim 1, wherein the housing unit can contain paper sheets ejected by using an auto duplexing unit, and can be easily fitted in a paper supply tray fitting part.

7. The image forming apparatus according to claim 6, wherein the housing unit has a key unit to be locked not to be pulled out from the paper supply tray fitting part.

8. The image forming apparatus according to claim 7, further comprising:
    an exclusive user information memory unit configured to store exclusive user information indicating a user who exclusively uses the housing unit by that paper sheets printed based on a confidential document print job ejected to the housing unit; and
    a registered exclusive user verifying unit configured to verify whether a user has been registered in the exclusive user information memory unit,
    wherein the key unit is unlocked if a user is verified to be a registered user by the exclusive user verifying unit.

9. The image forming apparatus according to claim 8, wherein the exclusive user information is one of the information indicating a predetermined group or the information indicating an individual user.

10. The image forming apparatus according to claim 8, further comprising:
an exclusive use judgment unit configured to judge whether the housing unit is exclusively used if printed paper sheets are ejected to the housing unit; and
a job waiting unit configured to wait for a confidential document print job,
wherein the print job waited in the job waiting unit is printed if the exclusive use judgment unit judges that the exclusive use of the housing unit is released.

11. The image forming apparatus according to claim 8, further comprising:
an exclusive use judgment unit configured to judge whether the housing unit is exclusively used if printed paper sheets are ejected to the housing unit;
a job waiting unit configured to wait for a confidential document print job, and
an inquiry unit configured to inquire whether the print job waiting in the job waiting unit is changed to a private print, if the exclusive use judgment unit judges that the housing unit is exclusively used,
wherein the print job is listed as a private print or continued to wait in the job waiting unit, based on the result of the inquiry by the inquiry unit.

12. The image forming apparatus according to claim 11, wherein the print job waiting in the job waiting unit is printed if the exclusive use judgment unit judges that the exclusive use of the housing unit is released.

13. The image forming apparatus according to claim 8, further comprising:
a clock configured to count date and time;
an end time memory unit configured to store the time counted with the clock by relating to the exclusive user information, if the ejection of paper sheets to the housing unit is completed;
a fixed time memory unit configured to store a preset fixed time;
an elapsed-time judgment unit configured to judge whether the time stored in the end time memory unit elapses for a fixed time stored in the fixed time memory unit, based on the time counted with the clock; and
a warning mail sending unit configured to send a warning mail to an exclusive user of the housing unit, if the elapsed-time judgment unit judges that the fixed time has elapsed.

14. The image forming apparatus according to claim 1, further comprising a print end mail sending unit configured to send a print end mail to a sender of the confidential document print job, if the ejection of paper sheets to the housing unit is completed.

15. The image forming apparatus according to claim 1, further comprising:
a second print processing unit configured to perform a private print which starts printing and ejecting printed paper sheets to the paper eject unit after receiving an instruction from a user, if the detecting unit detects that the number of pages to print of the received print job does not exceed the reference number stored in the reference number memory unit.

16. The image forming apparatus according to claim 1, wherein
the detecting unit that detects an empty housing unit, verifies that the user of sends the print job listed in the queue is the user listed in the user information database, assigns the verified user information to the exclusive user area corresponding to a name of the housing unit detected empty in the exclusive user table, and executes the print job, and ejects the printed paper sheets to the housing unit.

17. An image forming apparatus comprising:
housing means having a key unit to lock not to be taken out from the main body together with printed confidential documents;
ejecting means for ejecting printed paper sheets;
reference number storing means for storing a reference number to judge whether number of pages to be printed out exceeds predetermined print out pages;
detecting means for detecting the number of paper pages to print exceeds the reference number stored in the reference number storing means based on the setting of a confidential document print job, if receiving the print job through connecting means configured to connect a network; and
first print processing means for ejecting printed paper sheets to the housing means if the judgment means judges that the number of pages to print of the received print job exceeds the reference number stored in the reference storing means.

18. The image forming apparatus according to claim 17, further comprising:
second print processing means for performing a private print which starts printing and ejecting printed paper sheets to the paper eject unit after receiving an instruction from a user, if the detecting means detects that the number of pages to print of the received print job does not exceed the reference number stored in the reference number means.

19. A method of printing a confidential document print job of an image forming apparatus, comprising:
receiving a confidential document print job;
detecting whether the number of pages to print exceeds a reference number as a reference to detect whether number of pages to be printed out exceed predetermined print out pages, based on the setting of the print job;
ejecting the printed paper sheets to a housing unit having a key unit to lock not to be taken out from the main body together with printed confidential documents, if the number of pages to print exceeds the reference number; and
performing a private print which starts printing and ejecting printed paper sheets after receiving an instruction from a user, if the number of pages to print does not exceed the reference number.

20. The method of printing a confidential document print job of an image forming apparatus, according to claim 16, wherein
if detecting an empty housing unit, a detecting unit verifies that the user of sends the print job listed in the queue is the user listed in the user information database, assigning the verified user information to the exclusive user area corresponding to a name of the housing unit detected empty in the exclusive user table, and executing the print job, and ejects the printed paper sheets to the housing unit.

* * * * *